(12) United States Patent
Prasad et al.

(10) Patent No.: US 12,036,884 B2
(45) Date of Patent: Jul. 16, 2024

(54) PROPULSION SYSTEMS WITH POWER SOURCES COMPATIBLE WITH DIFFERENT CHARGING STATIONS AND DYNAMICALLY SCALABLE FOR DIFFERENT VEHICLE SPEED AND TORQUE MODES

(71) Applicant: GM GLOBAL TECHNOLOGY OPERATIONS LLC, Detroit, MI (US)

(72) Inventors: Rashmi Prasad, Troy, MI (US); Chandra S. Namuduri, Troy, MI (US); Suresh Gopalakrishnan, Troy, MI (US); Thomas W. Nehl, Shelby Township, MI (US); David J. Brooks, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 631 days.

(21) Appl. No.: 17/350,696

(22) Filed: Jun. 17, 2021

(65) Prior Publication Data
US 2022/0402395 A1 Dec. 22, 2022

(51) Int. Cl.
*B60L 50/60* (2019.01)
*B60L 53/60* (2019.01)

(52) U.S. Cl.
CPC .............. *B60L 53/60* (2019.02); *B60L 50/60* (2019.02); *B60L 2210/40* (2013.01); *B60L 2240/12* (2013.01)

(58) Field of Classification Search
USPC .......................... 320/106, 107, 108, 109, 110
See application file for complete search history.

(56) References Cited

U.S. PATENT DOCUMENTS

| | | | |
|---|---|---|---|
| 10,369,896 B2 | 8/2019 | Namuduri et al. | |
| 10,500,980 B2 | 12/2019 | Conlon et al. | |
| 10,654,370 B2 | 5/2020 | Namuduri et al. | |
| 2020/0161878 A1* | 5/2020 | Niimi ................... | H02J 7/0016 |
| 2021/0041505 A1 | 2/2021 | Fan et al. | |
| 2021/0091575 A1 | 3/2021 | Li et al. | |

FOREIGN PATENT DOCUMENTS

| | | | | |
|---|---|---|---|---|
| CN | 106655445 A | * | 5/2017 | |
| DE | 102019200874 A1 | * | 7/2020 | |
| WO | WO-2019082776 A1 | * | 5/2019 | ............... B60L 3/00 |

OTHER PUBLICATIONS

U.S. Appl. No. 16/533,180, filed Aug. 6, 2019, Fan et al.
U.S. Appl. No. 16/582,692, filed Sep. 25, 2019, Li et al.

* cited by examiner

*Primary Examiner* — Brian Ngo

(57) ABSTRACT

A charging system includes a scalable power source for powering a motor of a vehicle and telematics and battery management modules. The scalable power source includes: N battery packs, where N is an integer greater than or equal to 3; and multiple switches connected to the N battery packs including N−1 switches for serially connecting the N battery packs between supply and return lines and a multiple of N switches for parallel connecting the N battery packs to the supply and return lines. The telematics module requests capability of a charging station and receives a response signal from a device indicating the capability of the charging station. The battery management module: based on the capability of the charging station, selects one of the available arrangements in which to connect the N battery packs, sets states of the multiple switches; and then charges the N battery packs based on the states.

20 Claims, 8 Drawing Sheets

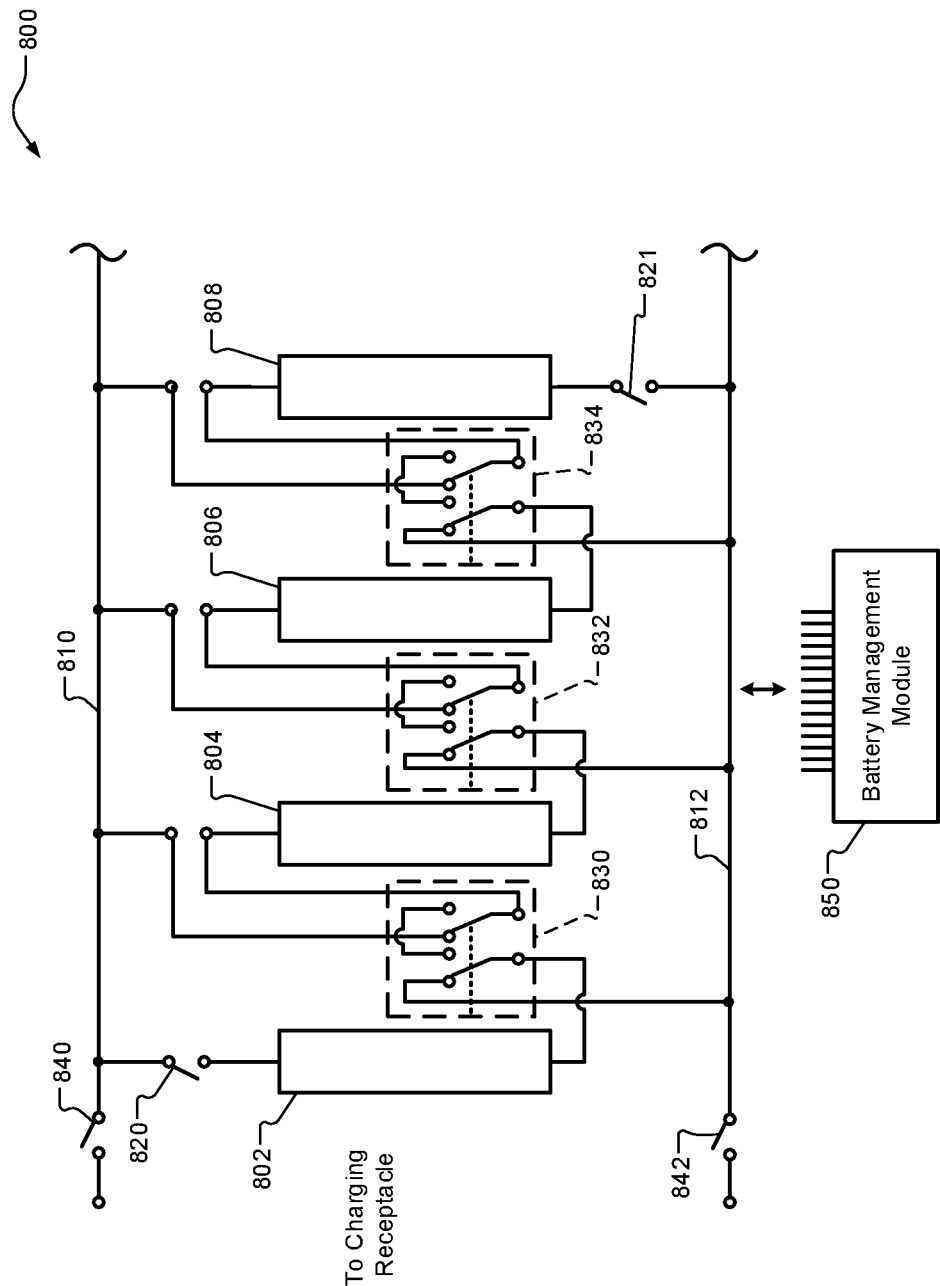

PROPULSION SYSTEMS WITH POWER SOURCES COMPATIBLE WITH DIFFERENT CHARGING STATIONS AND DYNAMICALLY SCALABLE FOR DIFFERENT VEHICLE SPEED AND TORQUE MODES

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to power sources for electric vehicles.

Electric vehicles include one or more power sources for supplying electrical energy to one or more electric motors. The electric motors are utilized for propulsion purposes and can also be used to reduce speed of the vehicles and recharge, for example, cells of the power sources. As an example, the electric motors may be operated as generators during regenerative braking operation to decelerate the vehicles and/or recharge the power sources.

SUMMARY

A charging system is provided and includes a scalable power source, a telematics module, and a battery management module. The scalable power source is for powering a motor of a vehicle and includes: supply and return lines; N battery packs, where N is an integer greater than or equal to 3; and multiple switches connected to the N battery packs and including (i) at least N−1 switches for serially connecting the N battery packs between the supply and return lines, and (ii) a multiple of N switches for parallel connecting the N battery packs to the supply and return lines. The telematics module is configured to establish a communicate link with a device external to the vehicle, request a capability of a charging station, and receive a response signal from the device indicating the capability of the charging station. The battery management module is configured to (i) based on the capability of the charging station, select one of multiple available arrangements in which to connect the N battery packs and set states of the plurality of switches to provide the selected one of the available arrangements, and then (ii) charge the N battery packs based on states of the multiple switches. The available arrangements include (i) a serial arrangement where the N battery packs are connected serially, (ii) a parallel arrangement where the N battery packs are connected in parallel, and (iii) a hybrid arrangement where sets of the N battery packs are connected in parallel and battery packs in one or more of the sets are connected serially.

In other features, the charging system further includes electromechanical relays, where each of the electromechanical relays is connected in parallel with a respective one of the plurality of switches.

In other features, the multiple switches are solid-state switches.

In other features, the at least N−1 switches are bidirectional. The multiple of N switches are bidirectional or unidirectional.

In other features, the battery management module is configured to isolate one or more of the N battery packs and charge a selected set of a remainder of the N battery packs. The selected set includes one or more of the remainder of the N battery packs.

In other features, the multiple of N switches includes only N switches.

In other features, the propulsion system includes: the charging system of claim 1; an inverter connected to the scalable power source; and the motor connected to the inverter. The battery management module is configured to (i) determine a speed of the vehicle, (ii) select the one of the available arrangements or another one of the available arrangements, and (iii) power the motor while the scalable power source is in the one of the available arrangements or the another one of the available arrangements.

In other features, a propulsion system is provided and includes a scalable power source and a propulsion control module. The scalable power source is for powering a motor of a vehicle and includes: supply and return lines; N battery packs, where N is an integer greater than or equal to 3; and multiple switches connected to the N battery packs and comprising (i) at least N−1 switches for serially connecting the N battery packs between the supply and return lines, and (ii) a multiple of N switches for parallel connecting the N battery packs to the supply and return lines. The propulsion control module is configured to determine a speed of the vehicle and, based on the speed of the vehicle, select one of multiple available arrangements in which to connect the N battery packs and set states of the multiple switches to provide the selected one of the plurality of available arrangements, wherein the available arrangements include (i) a serial arrangement where the N battery packs are connected serially, (ii) a parallel arrangement where the N battery packs are connected in parallel, and (iii) a hybrid arrangement where sets of the N battery packs are connected in parallel and battery packs in one or more of the sets are connected serially. The scalable power source is configured to power the motor of the vehicle while in the selected one of the plurality of available arrangements.

In other features, the propulsion system further includes: electromechanical relays connected in parallel with the switches; and the switches are solid-state switches.

In other features, the multiple of N switches include only N switches.

In other features, the propulsion control module is configured to: determine an output torque of a motor of the vehicle; and based on the output torque, select the one of the available arrangements or another one of the available arrangements.

In other features, the propulsion control module is configured to isolate one or more of the N battery packs and power the motor via a selected set of a remainder of the N battery packs. The selected set includes one or more of the remainder of the N battery packs.

In other features, a propulsion system is provided and includes a scalable power source and a battery management module. The scalable power source is for powering a motor of a vehicle and includes: supply and return lines; N battery packs, where N is an integer greater than or equal to 3; and multiple switches connecting the N battery packs to supply and return lines and comprising two single-pole-single-throw switches and 2N−2 single-pole-double-throw switches or N−1 double-pole-double-throw switches. The battery management module is configured to: determine a capability of a charging station or a parameter of the vehicle; based on the capability of the charging station or the parameter of the vehicle, select one of multiple available arrangements in which to connect the N battery packs, wherein the available arrangements include (i) a serial arrangement where the N battery packs are connected serially, (ii) a parallel arrangement where the N battery packs are connected in parallel, and (iii) a hybrid arrangement where sets of the N battery packs are connected in parallel and battery packs in one or more of the sets are connected serially; and set states of the multiple switches to provide the selected one of the plurality of available arrangements.

In other features, the propulsion system further includes a telematics module configured to establish a communicate link with a device external to the vehicle, request the capability of the charging station, and receive a response signal from the device indicating the capability of the charging station. The battery management module is configured to (i) based on the capability of the charging station, select the one of the available arrangements and set states of the plurality of switches to provide the selected one of the available arrangements, and then (ii) charge the N battery packs based on states of the multiple switches.

In other features, the battery management module is configured to, based on the parameter of the vehicle, select the one of the available arrangements in which to connect the N battery packs. The parameter is a speed of the vehicle.

In other features, the propulsion system further includes electromechanical relays connected in parallel with the switches.

In other features, the switches are solid-state switches.

In other features, the switches include a total of N+1 switches including the the two single-pole-single-throw switches and the N−1 double-pole-double-throw switches.

In other features, the battery management module is configured to isolate one or more of the N battery packs and charge a selected set of a remainder of the N battery packs. The selected set includes one or more of the remainder of the N battery packs.

In other features, the battery management module is configured to isolate one or more of the N battery packs and power the motor via the scalable power source with a selected set of a remainder of the N battery packs. The selected set includes one or more of the remainder of the N battery packs.

A charging system is provided and includes (i) a scalable power source for powering a motor of a vehicle, (ii) a telematics module, and (iii) a battery management module. The scalable power source includes: supply and return lines; N battery packs, where N is an integer greater than or equal to 3; and 3N−1 switches connected to the N battery packs and including (i) N−1 switches for serially connecting the N battery packs between the supply and return lines, and (ii) 2N switches for parallel connecting the N battery packs to the supply and return lines. The telematics module is configured to establish a communicate link with a device external to the vehicle, request a capability of a charging station, and receive a response signal from the device indicating the capability of the charging station. The battery management module is configured to (i) based on the capability of the charging station, select one of the available arrangements in which to connect the N battery packs and set states of the 3N−1 switches to provide the selected one of the available arrangements, and then (ii) charge the N battery packs based on states of the 3N−1 switches. The available arrangements include (i) a serial arrangement where the N battery packs are connected serially, (ii) a parallel arrangement where the N battery packs are connected in parallel, and (iii) a hybrid arrangement where sets of the N battery packs are connected in parallel and battery packs in one or more of the sets are connected serially.

In other features, the charging system further includes 3N−1 electromechanical relays, where each of the 3N−1 electromechanical relays is connected in parallel with a respective one of the 3N−1 switches.

In other features, the 3N−1 switches are solid-state switches.

In other features, the N−1 switches are bidirectional. The 2N switches are bidirectional or unidirectional.

In other features, the battery management module is configured to isolate one or more of the N battery packs and charge a selected set of a remainder of the N battery packs. The selected set includes one or more of the remainder of the N battery packs.

In other features, the device is implemented at the charging station or remote from the charging station.

In other features, a propulsion system provided and includes: the charging system of claim 1; an inverter connected to the scalable power source; and the motor connected to the inverter. The battery management module is configured to (i) determine a speed of the vehicle, (ii) select the one of the available arrangements or another one of the available arrangements, and (iii) power the motor while the scalable power source is in the one of the available arrangements or the another one of the available arrangements.

In other features, a propulsion system is provided and includes (i) a scalable power source for powering a motor of a vehicle, and (ii) a propulsion control module. The scalable power source includes: supply and return lines; N battery packs, where N is an integer greater than or equal to 3; and 3N−1 switches connected to the N battery packs and including (i) N−1 switches for serially connecting the N battery packs between the supply and return lines, and (ii) 2N switches for parallel connecting the N battery packs to the supply and return lines. The propulsion control module is configured to: determine a speed of the vehicle; and based on the speed of the vehicle, select one of available arrangements in which to connect the N battery packs and set states of the 3N−1 switches to provide the selected one of the available arrangements, where the available arrangements include (i) a serial arrangement where the N battery packs are connected serially, (ii) a parallel arrangement where the N battery packs are connected in parallel, and (iii) a hybrid arrangement where sets of the N battery packs are connected in parallel and battery packs in one or more of the sets are connected serially. The scalable power source is configured to power the motor of the vehicle while in the selected one of the available arrangements.

In other features, the propulsion system further includes 3N−1 electromechanical relays connected in parallel with the 3N−1 switches.

In other features, the 3N−1 switches are solid-state switches.

In other features, the propulsion control module is configured to: determine an output torque of a motor of the vehicle; and based on the output torque, select the one of the available arrangements or another one of the available arrangements.

In other features, the propulsion control module is configured to isolate one or more of the N battery packs and power the motor via a selected set of a remainder of the N battery packs. The selected set includes one or more of the remainder of the N battery packs.

In other features, a propulsion system is provided and includes (i) a scalable power source for powering a motor of a vehicle, and (ii) a battery management module. The scalable power source includes: supply and return lines; N battery packs, where N is an integer greater than or equal to 3; 2N switches connecting the N battery packs to supply and return lines and including two single-pole-single-throw switches and 2N−2 single-pole-double-throw switches; and N−1 conductive lines connecting the N−1 pairs of the N battery packs. The battery management module is configured to: determine a capability of a charging station or a parameter of the vehicle; based on the capability of the charging station or the parameter of the vehicle, select one of multiple available arrangements in which to connect the N battery packs, where the available arrangements include (i) a serial arrangement where the N battery packs are connected serially, (ii) a parallel arrangement where the N battery packs are connected in parallel, and (iii) a hybrid arrangement where sets of the N battery packs are connected in parallel and battery packs in one or more of the sets are connected serially; and set states of the 2N switches to provide the selected one of the available arrangements.

In other features, the propulsion system further includes a telematics module configured to establish a communicate link with a device external to the vehicle, request the capability of the charging station, and receive a response signal from the device indicating the capability of the charging station. The battery management module is configured to (i) based on the capability of the charging station, select the one of the available arrangements and set states of the 2N switches to provide the selected one of the available arrangements, and then (ii) charge the N battery packs based on states of the 2N switches.

In other features, the battery management module is configured to, based on the parameter of the vehicle, select the one of the available arrangements in which to connect the N battery packs. The parameter is a speed of the vehicle.

In other features, the propulsion system further includes 2N electromechanical relays connected in parallel with the 2N switches.

In other features, the 3N−1 switches are solid-state switches.

In other features, each of the N−1 conductive lines directly connects a pair of the 2N−2 single-pole-double-throw switches.

In other features, the battery management module is configured to isolate one or more of the N battery packs and charge a selected set of a remainder of the N battery packs. The selected set includes one or more of the remainder of the N battery packs.

In other features, the battery management module is configured to isolate one or more of the N battery packs and power the motor via the scalable power source with a selected set of a remainder of the N battery packs. The selected set includes one or more of the remainder of the N battery packs.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 8 is a schematic diagram of an example of a portion of a scalable power source including double-pole-double-throw switches in accordance with the present disclosure.

In the drawings, reference numbers may be reused to identify similar and/or identical elements.

DETAILED DESCRIPTION

Figure 1:
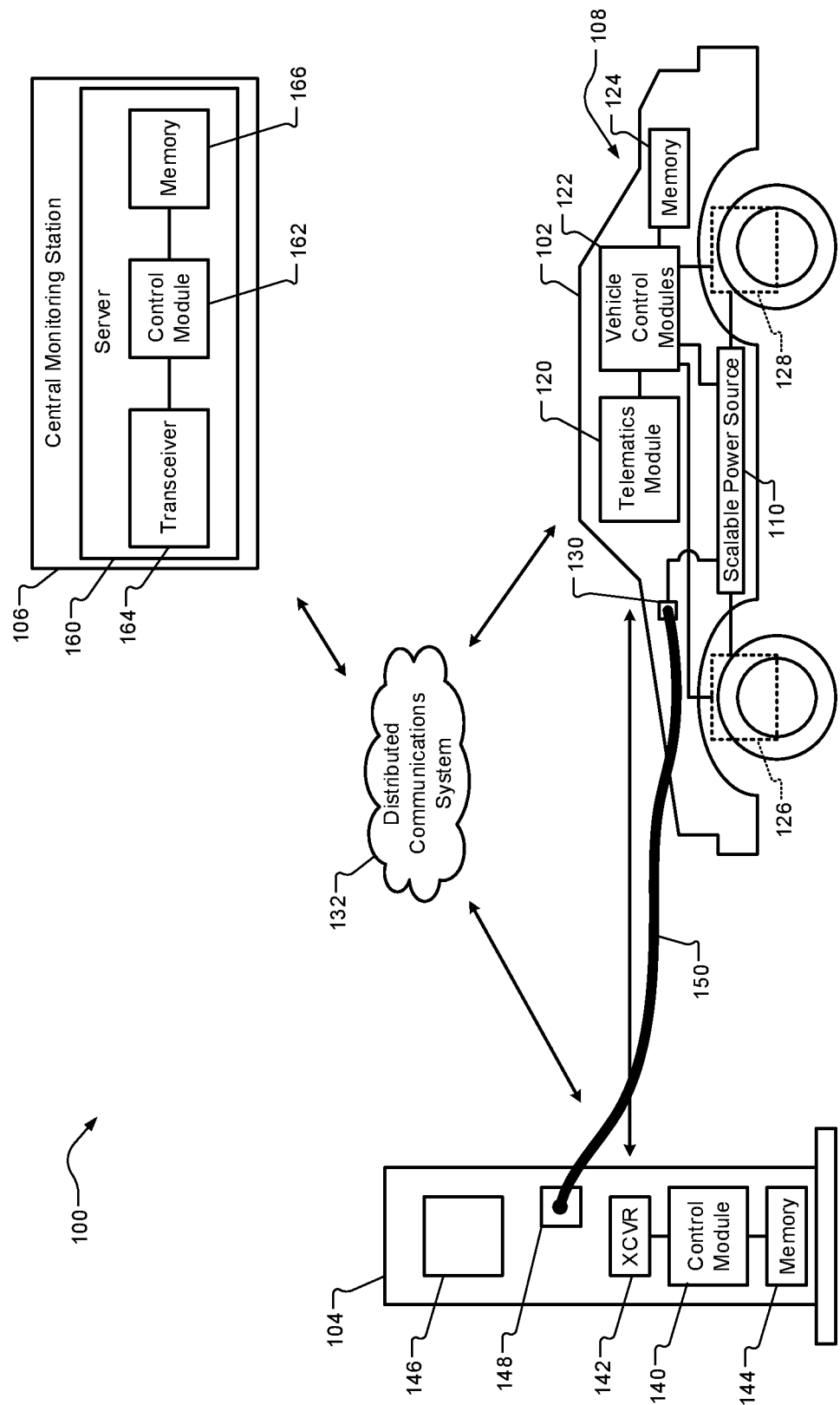
FIG. 1 is a functional block diagram of an example of a charging system including a vehicle with a propulsion system having a scalable power source in accordance with the present disclosure.

The power source of an electric vehicle may include multiple cells and/or battery packs that are connected in series and/or in parallel to provide a predetermined voltage output. The cells and/or battery packs can be in a fixed configuration to be compatible with a particular type of charging station. A charging station may have a maximum output voltage rating of 400 volts (V), 800V or 1600V and have a nominal output voltage of, for example, 375V, 750V, or 1500V. The charging stations may have maximum output power ratings of 150 kilo-watts (kW), 350 kW or 900 kW. A 1500V charging station may have a maximum output current rating of 600 amperes (A). The stated voltages, power levels, and current level are provided as examples only. Charging stations may have other voltage current and/or power ratings and outputs. Traditional power sources tend to exhibit long charging times relative to refueling time of vehicles with internal combustion engines.

The examples set forth herein include propulsion systems with scalable power sources that are compatible with different types of charging stations. The power sources are dynamically configurable to connect to different charging stations and to be charged at maximum voltage levels of the different charging stations. This provides efficient charging of the power sources and allows for increased use of the power sources in different geographical regions having different types of charging stations. The power sources include nominal low voltage energy storage devices (or battery packs), which are configurable for high voltage and high power direct current (DC) charging.

The propulsion systems are configured to communicate with the charging stations, remote devices, and/or other infrastructure devices to determine capabilities of the charging stations and then dynamically be configured to be charged at maximum voltage levels of the charging stations. The propulsion systems perform switch sequencing for transitioning switches to appropriate states to match the battery voltage of the vehicle to a maximum voltage of the currently connected charging station. As a result, the propulsion systems are forward compatible for charging stations with maximum charging voltages higher than the native voltage of the vehicle (e.g., voltages greater than 800V for an 800V vehicle electric system) and backwards compatible for charging stations with maximum charging voltages lower than the native voltage of the vehicle (e.g., less than or equal to 800V for an 800V vehicle electric system).

The disclosed propulsion systems are also dynamically adjustable for different vehicle speed and torque operating modes. The power sources are reconfigured based on (i) set and/or target speeds of the corresponding vehicles, and/or (ii) set and/or target output torques of corresponding electric motors. This allows for quick scaling of voltage, current and power output levels to efficiently handle various speed, acceleration and/or torque levels at any moment in time.

Figure 2:
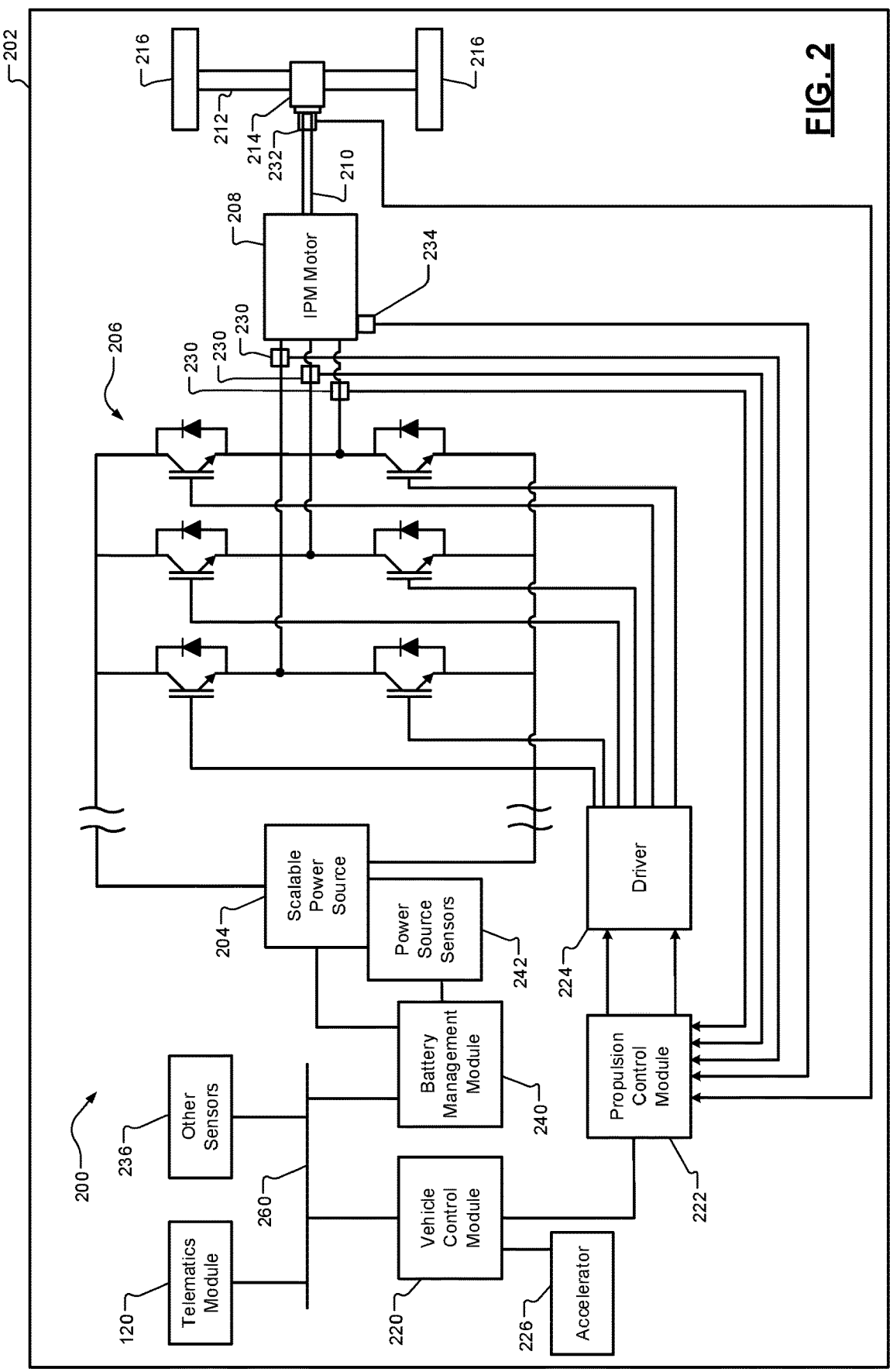
FIG. 2 is a functional block diagram of an example of a propulsion system including a scalable power source in accordance with the present disclosure.
Figure 3:
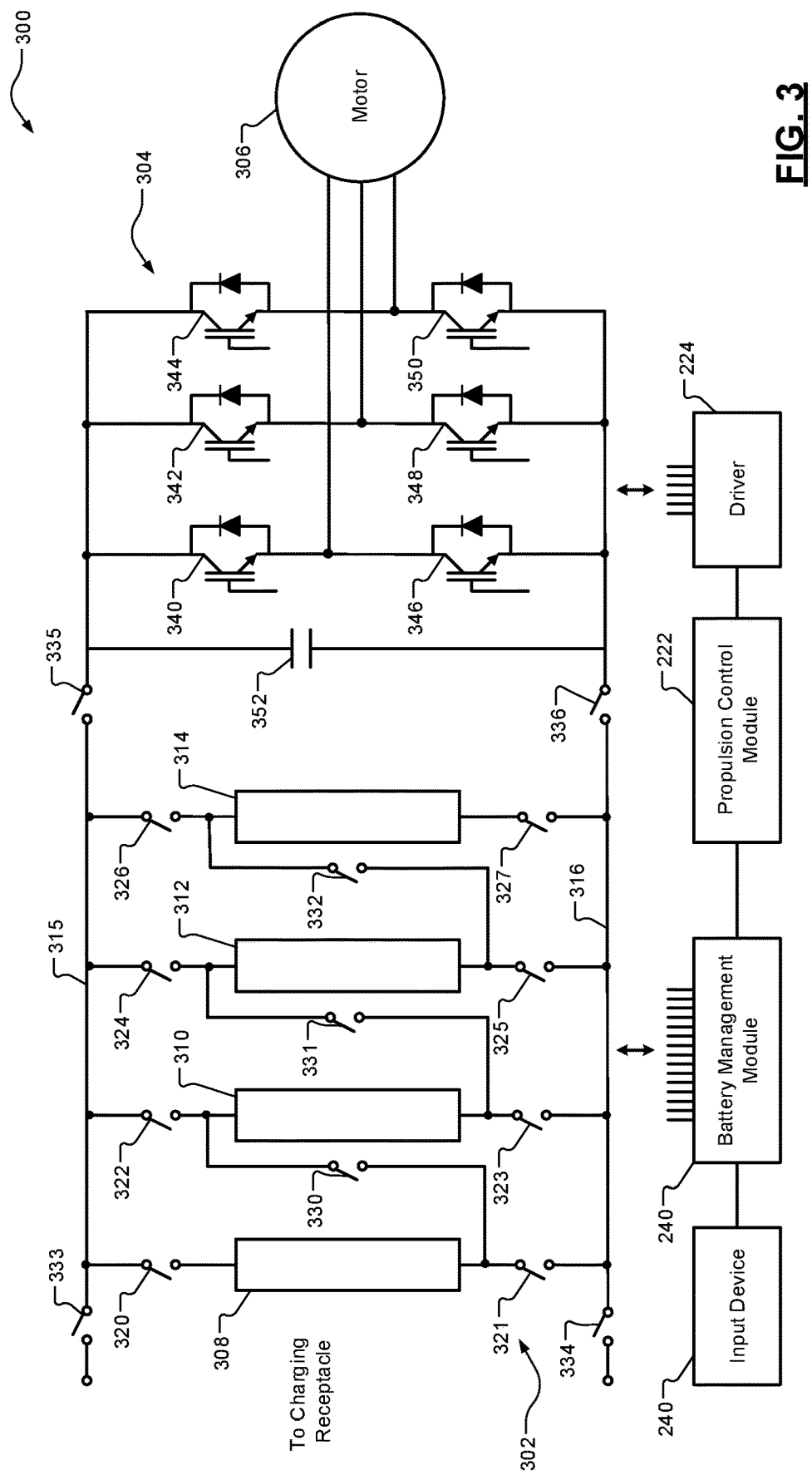
FIG. 3 is a schematic diagram of an example of a portion of a propulsion system including a scalable power source in accordance with the present disclosure.
Figure 4:
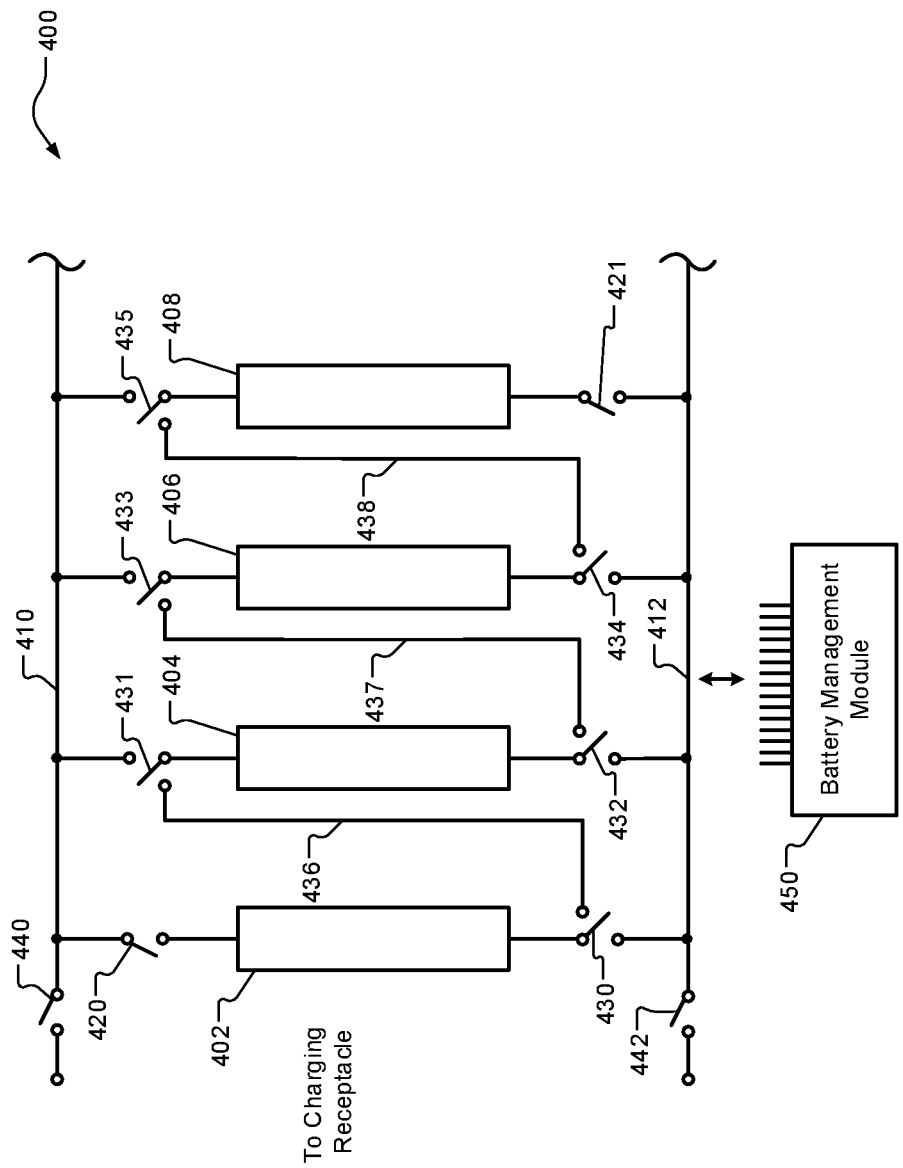
FIG. 4 is a schematic diagram of an example of a portion of a scalable power source including single-pole-double-throw switches in accordance with the present disclosure.

FIG. 1 shows a charging system 100 including a vehicle 102, a charging station 104 and a central monitoring station 106. The vehicle 102 includes a propulsion system 108 having a scalable power source 110 (hereinafter power source 110). Some examples of the power source 110 are shown in FIGS. 2-4. The power source 110 is dynamically adjustable to receive different maximum output voltages current and/or power levels of different types of charging stations.

The propulsion system 108 further includes a telematics module 120, vehicle control modules 122, a memory 124, motors 126, 128 and a charging connector 130. The telematics module 120 may include transceivers and communicate with the charging station 104, the central monitoring station 106 and/or other infrastructure device. This communication may occur via a distributed communications system 132. The telematics module 120 may communicate with infrastructure devices according to Wi-Fi, Bluetooth and/or wireless local area network, wide area network, and/or other communication protocols. The vehicle control modules 122 may include a body control module, a propulsion control module, a battery management module, etc. Although two motors are shown, any number of motors may be included. The motors 126, 128 may be controlled by one or more of the vehicle control modules.

The power source 110 may include any number of cells, battery packs, and/or power modules, which may be dynamically connected in various series and/or parallel symmetrical arrangements to be compatible with different types of charging stations. The battery packs may each include the same number of cells connected in a same arrangement, such that each battery pack has a same output voltage rating and output current rating. The cells, battery packs, and/or power modules may also be dynamically connected in various series and/or parallel symmetrical arrangements to accommodate different speed, acceleration and torque requests and/or operating modes. The power source 110 may be configured for: various voltage levels, such as maximum output voltages of 400V, 800V, and 1600V and/or nominal output voltages of 375V, 750V, and 1500V; and various power levels, such as maximum output power levels of 150 kW, 350 kW and 900 kW. The power source 110 may also be configured to command different maximum charging current levels, if needed, such as 200A, 400A, 500A and 600A depending on the state of charge and charge rate of the power source 110.

The charging station 104 may include a control module 140, a transceiver 142, a memory 144, a display 146 and a charging connector 148. The charging station 104 communicates with the vehicle 102 via the transceiver 142. An electrical power line 150 is connected from the charging connector 148 to the charging connector 130 while charging the power source 110. In one embodiment, the control module 140 communicates with, for example, a battery management module of the vehicle 102 to indicate to the battery management module, charging capabilities (e.g., maximum output voltage and current levels) of the charging station 104. The charging station 104 may receive utility power and supply power at a predetermined voltage level to the vehicle 102 and/or the power source 110. Prior to charging, the power source 110 is configured to be charged at the maximum output voltage level of the charging station 104. The charging station 104 may be located in a residential building, at a business, at a roadside recharging station, at a public facility, and/or elsewhere.

The central monitoring station 106 may be located at a charging center along with the charging station 104 or may be located elsewhere. The central monitoring station 106 may be a service provider station, a central power station, or manufacturer monitoring station. The central monitoring station 106 may include a server 160, which may in turn include a control module 162, a transceiver 164 and memory 166. The control module 162 may collect charging station capability information including maximum charging voltage and current levels and indicate the capabilities to vehicles, such as the vehicle 102. The battery management module may then configure the power source 110 based on the capabilities of the charging station 104.

FIG. 2 shows a propulsion system 200 of a vehicle 202 that includes a scalable power source 204, which may be similar to the power source 110 of FIG. 1. The power source 204 powers an inverter 206, which in turn drives a motor (e.g., an interior permanent magnet (IPM) motor 208. Some examples of the power source are shown in FIGS. 3-4. Although the motor 208 is shown as an IPM motor, the motor 208 may be a surface permanent magnet motor or other type of electric motor. Although various examples are disclosed herein with respect to a motor, the examples are applicable to other electric machines.

The propulsion system 200 is used to move the vehicle 202 and further includes a shaft 210, an axle 212 including a differential 214 and wheels 216. The inverter 206 converts a DC voltage to a three-phase alternating current (AC) to power the motor 208. The motor 208 rotates the shaft 210, which in turn rotates the axle 212 via the differential 214.

The propulsion system 200 further includes a vehicle control module 220, a propulsion control module 222 and a driver 224. The vehicle control module 220 may generate a torque request signal. The torque request signal may be generated based on torque commanded, for example, by an accelerator 226 if included. The propulsion control module 222 may control the driver 224 based on the torque request signal. The driver 224 may, for example, generate pulse width modulation (PWM) signals to control states of transistors of the invertor 206 based on output of the propulsion control module 222.

The propulsion control module 222 controls the driver 224 based on outputs from sensors. The sensors may include current sensors (e.g., Hall Effect sensors 230), a resolver 232, a temperature sensor 234, and/or other sensors 236 (e.g., an accelerometer). The current sensors may include sensors other than Hall Effect sensors.

The propulsion control module 222 performs a transformation of current phase signals Ia, Ib and Ic for the three phases of the motor to current vector signals Id and Iq. The propulsion control module 222 determines how much current is flowing and how much current is needed (or requested) and modifies input current levels of the motor 208 by adjusting output current vector voltage signals supplied to the driver 224. This is based on (i) the current vector signals Id, Iq, (ii) the position signal out of the resolver 232, and (iv) the torque request signal from the vehicle control module 220.

A propulsion system 200 may include one or more electric motors. Each electric motor may be used to drive one or more axles and/or one or more wheels of the vehicle 202. As an example, an electric motor may be used to drive an axle of the vehicle 202 via a differential. The vehicle control module 220, based on a torque request, may signal the electric motor to rotate an input gear of the differential and as a result, the wheels attached to the axle. The vehicle control module 220 may adjust current, voltage and/or power levels of the electric motor to control acceleration, deceleration and/or speed of the vehicle 202.

The propulsion system 200 further includes the telematics module 120, a battery management module 240 and power source sensors and/or status monitoring devices (referred to as power source sensors 242). The battery management module 240 may configure the power source 204 as further described below based on output of the above-stated sensors, speed requests, current traveling speed, torque requests, charge states of battery packs of the power source 204, etc. The power source sensors 242 may include voltage sensors, current sensors, and/or other circuit elements used to monitor charge states of the battery packs and/or cells of the battery packs. The battery management module 240 may isolate one or more cells and/or battery packs when: operating inappropriately; not charging to a predetermined voltage level; outputting a voltage and/or an amount of current at level(s) below predetermined minimum level(s); and/or exhibiting another abnormality. The modules 120, 220, 240, and sensors 236 may be connected and/or communicate with each other via a controller area network (CAN) 260 or other form of communication.

FIG. 3 shows a propulsion system 300 including a scalable power source 302, an inverter 304 and a motor 306. The power source 302 includes three or more symmetrical battery packs. As an example, four battery packs 308, 310, 312, 314 are shown. The battery packs may each include any number of cells. The cells of each battery pack may be connected in series or parallel or a combination of both. The output voltages of the battery packs are the same or within in a predetermined tolerance range of each other. If one of the battery pack voltages is outside of the predetermined tolerance range, then the battery pack is identified as degraded, faulty and/or operating inappropriately and may be isolated.

Series and parallel connections are provided for connecting the battery packs 308, 310, 312, 314 in series and/or in parallel. The parallel connections connect the ends of the battery packs to supply and return lines 315, 316 via a respective pair of high-side and low-side switches per battery pack. The packs 308, 310, 312, 314 have respective pairs (320, 321), (322, 323), (324, 325), (326, 327). Each of the serial connections connect an output of a first battery pack to an input of a next battery pack. For N battery packs, there are N−1 serial connections, where each of the connections includes a respective switch and N is an integer greater than or equal to 2. In one embodiment, N is greater than or equal to 3. In another embodiment, N is greater than or equal to 4. In the example shown, three serial connections are provided including respectively switches 330, 331, 332 on respective intermediary conductive lines. Two or more of the battery packs may be connected in series while two or more of the battery packs may be connected in parallel. In one embodiment and/or operating mode, multiple sets of electrically symmetric battery packs, each set including two or more battery packs, are connected in series and two or more battery packs and/or sets of battery packs are connected in parallel. As an example, battery packs 308 and 310 may be connected in series to provide a first set, battery packs 312 and 314 may be connected in series to provide a second set, and the first set may be connected in parallel with the second set.

A first pair of switches 333, 334 may be serially connected to inputs of the supply and return lines 315, 316. A second pair of switches 335, 336 may be connected to the supply and return lines 315, 316 between the power source 302 and the inverter 304. States of the switches 320-327 and 330-336 may be controlled by the battery management module 240.

For the example of FIG. 3, there is a minimum of 3N−1 switches for serial and parallel connection of the N battery packs. For the example shown having four battery packs, there are 11 switches for serial and/or parallel connection of the battery packs. For this and other embodiments, there are N strings of the same type of storage device that can be selectively connected in series or parallel during DC fast charging and during propulsion operation. Each of the strings includes the same type of storage device (or battery pack) having the same voltage and current ratings. The 3N−1 switches include (i) N−1 switches for serially connecting the N battery packs between supply and return lines, and (ii) 2N switches for parallel connecting the N battery packs to the supply and return lines. The 2N switches for parallel connecting the N battery packs to the supply and return lines may also be used for serially connecting the N battery packs between supply and return lines.

The switches 320-327 and 330-336 may be implemented as solid-state switches configured for ultra-low voltage drops, such as that experienced during power ON and power OFF periods and/or other high transient current periods. A high transient (or surge) current period may refer to: a start of charging a corresponding battery pack; an end of charging a corresponding battery pack; a start of powering a motor using a corresponding battery pack; an end of powering a motor; or when multiple battery packs are transitioned to being connected in parallel. The solid-state switches may include metal-oxide-semiconductor (MOS) controlled thyristors (MCTs), gallium nitride (GaN) field-effect transistors (FETs), silicon carbide (SiC) junction-gate field-effect transistors (JFETs), metal-oxide-semiconductor field-effect transistors (MOSFETs), insulated-gate bipolar transistors (IGBTs) or other low loss devices and/or contactors of suitable voltage and current ratings. In one embodiment, the switches 320-327 and 330-336 are implemented as electromechanical relays.

Figure 7:
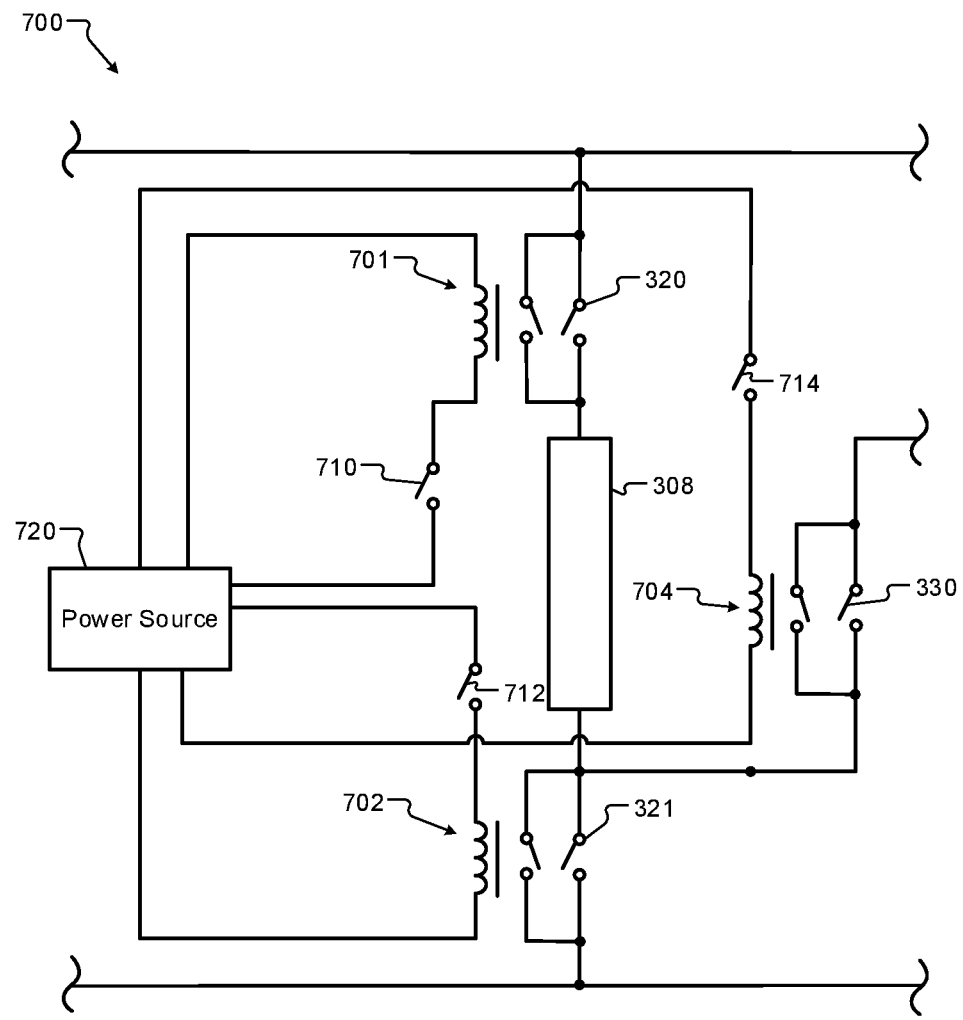
FIG. 7 shows a schematic diagram of a portion of a scalable power source including solid-state switches connected in parallel with electromechanical relays in accordance with the present disclosure.

In one embodiment, each of the switches 320-327 and 330-336 is includes an electromechanical relay connected in parallel with a solid state switch. Connecting each of the switches 320-327 and 330-336 in parallel with an electromechanical relay (or contactor) distributes current load on the switch and the electromechanical relay. An example of this is shown in FIG. 7. In one embodiment, the electromechanical relays are closed (or working), but when high transient current periods, the solid-state switches connected in parallel with the electromechanical relays are pulsed to reduce loss. The electromechanical relays may be opened when the solid-state switches are closed or pulsed with a duty cycle.

In one embodiment, the solid-state switches are initially closed and the electromechanical relays are maintained in a de-energized state during a start of current flow. After a first predetermined period, the electromechanical switches are closed and then the solid-state switches are either opened or left in a closed state. When stopping current flow, the reverse process is performed where the solid-state switches, if open, are closed and after a second predetermined period, the electromechanical switches are opened. The solid-state switches are then opened a third predetermined period after the electromechanical switches are opened. The solid-state switches may be used to carry the current experienced during switching from ON-to-OFF or OFF-to-ON states of electromechanical relays to eliminate arcing. The stated process may be performed, for example, when switching from having battery packs connected in series to having the battery packs connected in parallel, which can cause an in rush of current to one or more battery packs to balance voltages of the battery packs if the voltages are not identical. This protects contacts of the electromechanical relays. With solid-state switches there is not mechanical switching of contacts. The solid-state switches are able to dissipate more power than the electromechanical switches. There may be a 10-20 millisecond transition period between operating with solid-state switches in closed states and operating with electromechanical switches in closed states. This period may also be provided when transitioning from closed to open states. When selected ones of the switches (e.g., selected ones of the switches 320-327 and 330-332) are closed for an extended period of time, the electromechanical switches may be used and closed and the solid-stated switches may be open.

In one embodiment, the serial switches (e.g., the switches 330-332) are bi-directional switches and the other switches 320-327 may be bi-directional or unidirectional depending on the system architecture. When the power source 302 is used for propulsion, current may be supplied to the power source 302 or may be drawn from the power source 302, depending on whether operating in a driving mode (e.g., motor 306 moving and/or accelerating vehicle) or operating in a regenerative braking mode, where the motor 306 is operating as a generator.

The following Table 1 includes example closed and open switch states for different exemplary charging and/or propulsion source voltages assuming each pack can support an exemplary voltage of 375V nominal.

TABLE 1

Exemplary Switch Control Logic for Balanced Operation with Four identical Energy Storage Strings.

| Charging Voltage | Switches in Closed States | Switches in Open States |
|---|---|---|
| 375 V | Switches 320-327 | Switches 330-332 |
| 750 V | Switches 320, 323, 324, 327, 330, 332 | Switches 321, 322, 325, 326, 331 |
| 1500 V | Switches 320, 327, 330-332 | Switches 321-326 |

Various intermediate charging or discharging voltages exist across the supply and return lines 315, 316 that are integral multiples (odd or even) of battery pack voltages, where not all battery packs are charged or discharged at the same time. This is accomplished by appropriate series and parallel switch selection (i.e. closing) of the switches (e.g., the switches 320-327 and 330-332). As an example, a first set of one or more battery packs may be charged prior to or subsequent to a second set of one or more battery packs.

In another embodiment, charging or discharging of only selected battery packs is performed at any given instance in time. This is achieved through selective switch closing and opening to connect selective ones of the battery packs in series and/or in parallel to achieve better charge or discharge balancing or during a fault condition in specific packs. As an example switches 322, 331, 325 may be closed and the remainder of switches 320-327 and 330-332 are kept open for connecting in series and charging of battery packs 310, 312 and not charging of battery packs 308, 314.

In another embodiment, switches 320 and 327 are not included in the power source 302 when, for example, switches 333 and 334 are included. Switches 333 and 334 may be closed and opened in a similar manner as switches 320 and 327 to connect the battery packs 308, 310, 312, 314 in different arrangements. Inputs of the switches 333, 334 may be referred to as a direct current fast charging port.

The inverter 304 may include high-side and low-side switch and diode pairs 340, 342, 344, 346, 348, 350. A capacitor 352 may be connected between the supply and return lines 315, 316. States of the switches of the switch and diode pairs 340, 342, 344, 346, 348, 350 may be controlled by the propulsion control module 222, which controls the driver 224. The driver 224 is connected to the switches of the inverter 304. The inverter 304 drives the motor 306. In a regenerative mode, the motor 306 may be used to recharge the battery packs.

The reconfigurable power storage of the power source 302 provides adaptive bus voltage, for example, at the input of the inverter 304 across the capacitor 352. This improves overall drive system efficiency and torque-speed capability of the propulsion system 300. The battery packs, having serially connected cells and/or parallel connected cells, are selected and thus connected for maximum current flow charging of a given charging station to which the power source 302 is connected.

The propulsion system 300 may include an input device 350. The input device 350 may be used, for example, to manually select a mode of operation, as further described below. The input device may be a touch screen, a microphone, a portable network device, a switch, a key pad, etc.

In one embodiment, the switches 320, 322, 324 and 326 are not included. In this embodiment, the battery packs 308, 310, 312, 314 may be directly connected to the supply line 315. This reduces the total number of switches from 3N−1 to 2N−1 and still allows for serial and parallel connection of the battery packs 308, 310, 312, 314, as described above. For example, the battery packs 308, 310, 312, 314 may be connected in series when the switches 330, 331, 332 and 327 are closed and switches 321, 323, 325 and 327 are open. The battery packs 308, 310, 312, 314 may be connected in parallel when the switches 330, 331, 332 are open and switches 321, 323, 325 and 327 are closed. In the disclosed 3N−1 and 2N−1 switch arrangements there are at least N−1 switches for serially connecting the N battery backs and a multiple of N (e.g., 2N or N) switches for parallel connecting the N battery packs to the supply and return lines.

FIG. 4 shows a scalable power source 400 including battery packs 402, 404, 406 and 408 that may be connected in series or in parallel between supply and return lines 410, 412. Although four battery packs are shown, two or more battery packs may be included with respective high-side and low-side switches for connections to the supply and return lines 410, 412. The power source 400 includes two single-pole-single-throw (SPST) switches 420, 421 and 2N−2 single-pole-double-throw (SPDT) switches 430-435, where N is an integer greater than or equal to 2. The pairs of the SPDT switches are connected to each other via intermediary conductive lines 436, 437, 438. In one embodiment, N is greater than or equal to 3. In another embodiment, N is greater than or equal to 4. Input switches 440, 442 may be included. The states of the switches 420-421, 430-435, and 440, 442 may be set by the battery management module 450, which may operate similarly as and/or replace one of the above-disclosed battery management modules.

The power source 400 is similar to the power source 302 of FIG. 3 in that it includes multiple similarly configured strings and battery packs. However, the first string and the last string include a single SPST switch and a single SPDT switch and the middle (or intermediate) strings include two SPDT switches. Any two sets of SPST switches may be replaced with SPDT switches and hence it is not necessary to have 2N SPDT switches. This arrangement includes fewer switches than the arrangement of the power source 302. There is a total of 2N switches instead of 3N−1 switches. The battery packs 402, 404, 406, 408 may be connected in series and/or parallel.

When OFF, the SPDT switch poles of the SPDT switches 430-435 are configured to connect the battery packs 402, 404, 406, 408 in parallel. When ON, the SPDT switch poles of the SPDT switches 430-435 are configured to connect the battery packs 402, 404, 406, 408 in series.

When two adjacent battery packs (e.g., battery packs 402, 404) are to be connected in series, the battery packs may be turned ON by closing corresponding switches (e.g., switches 420 and 430-432) to connect the battery packs in series and to the supply and return lines 410, 412. The corresponding switches (e.g., switches 430-431), which are connected between the battery packs, are connected to each other via an intermediary conductive line (e.g., line 436). As a couple other examples, battery packs 404 and 406 or battery packs 406 and 408 may be connected in series instead of battery packs 402 and 404. An even or an odd number of battery packs may be connected in series or in parallel. When all of the SPDT switches (e.g., switches 430-435) are ON, all of the battery packs (e.g., battery packs 402, 404, 406, 408) are connected in series. When all of the SPDT switches are OFF, the battery packs may all be connected in parallel when the SPST switches 420 and 421 are closed.

The power source 400 as shown may include the following connected states when all of the battery packs 402, 404, 406, 408 are available, which are similar to the possible connected states of the power source 302 of FIG. 3. The connected states include: the battery packs 402, 404, 406, 408 being connected in parallel and to the supply and return lines 410, 412; two pairs of the battery packs 402, 404, 406, 408 being connected in parallel and the parallel sets being connected to the supply and return lines 410, 412 and the battery packs in each pair of the battery packs being connected in series; and the battery packs 402, 404, 406, 408 being connected in series and ends of the connected series being connected to the supply and return lines 410, 412. When, for example, one or more of the battery packs are being isolated, then the available connected states are different. For example, if one of the battery packs 402, 404, 406, 408 is isolated, then the remaining battery packs may be (i) connected in series or in parallel and to the supply and return lines 410, 412, or (ii) a subset of the remaining battery packs may be connected in series or in parallel and to the supply and return lines 410, 412. In one embodiment, one or more battery packs are isolated and output voltage is limited while operating in a "limp home" mode. This allows a vehicle to return home and/or drive to a service center.

In one embodiment, one or more of the SPDT switches 430-435 are replaced with respectively one or more SPST switches. The SPST switches may be configured similarly as the SPST switches 321-326 of FIG. 3. The associated intermediary conductive lines may be connected between the SPST switches and the associated battery packs in a similar manner as the intermediary conductive lines shown in FIG. 3, except without an intermediary switch, such as one of the switches 330, 331, 332 of FIG. 3.

Figure 5:
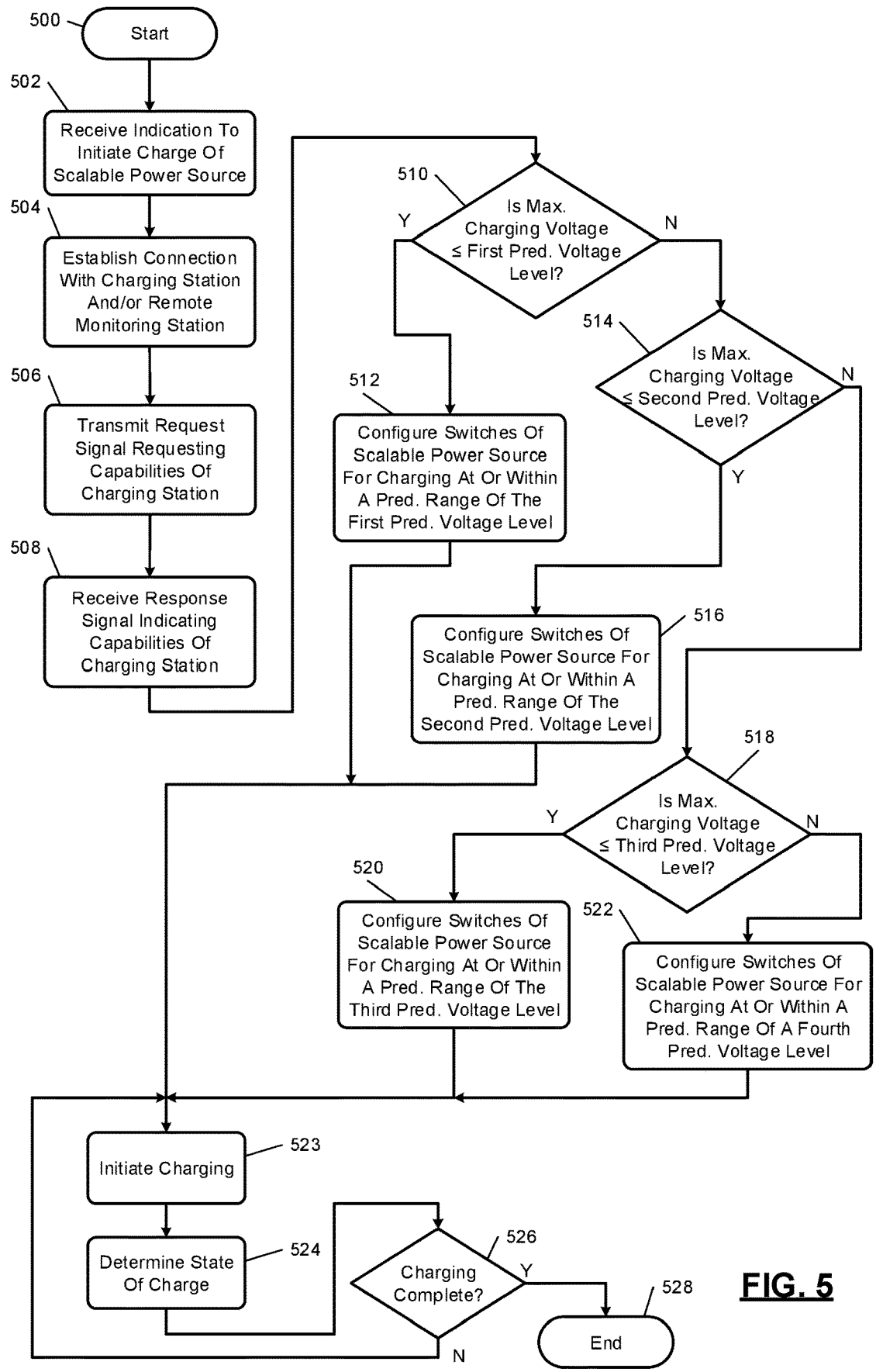
FIG. 5 illustrates an example charging method implemented by a propulsion system in accordance with the present disclosure.

FIG. 5 shows a charging method implemented by a propulsion system. Although the following operations are primarily described with respect to the implementations of FIGS. 1-4 and 8, the operations may be easily modified to apply to other implementations of the present disclosure. The operations may be iteratively performed by one of the disclosed battery management modules. The method may begin at 500. At 502, the battery management module receives an indication to initiate charging of a scalable power source, such as one of the scalable power sources disclosed herein. At 504, the battery management module may establish a connection with a charging station (e.g., the charging station 104 of FIG. 1) and/or other infrastructure device.

At 506, the battery management module may transmit a request signal to the charging station 104 and/or other infrastructure device requesting capabilities of the charging station. At 508, the battery management module may receive a response signal indicating the capabilities of the charging station, which may include a maximum charging voltage, a maximum current flow, and/or other parameter.

At 510, the battery management module determines whether the maximum charging voltage is less than or equal to a first predetermined voltage level (e.g., 200V). If yes, operation 512 may be performed, otherwise operation 514 may be performed. At 512, the battery management module configures the switches of the power source for charging at or within a predetermined range of the first predetermined voltage level.

At 514, the battery management module determines whether the maximum charging voltage is less than or equal to a second predetermined voltage level (e.g., 400V). If yes, operation 516 may be performed, otherwise operation 518 may be performed. At 516, the battery management module configures the switches of the power source for charging at or within a predetermined range of the second predetermined voltage level.

At 518, the battery management module determines whether the maximum charging voltage is less than or equal to a second predetermined voltage level (e.g., 800V). If yes, operation 520 may be performed, otherwise operation 522 may be performed. At 520, the battery management module configures the switches of the power source for charging at or within a predetermined range of the third predetermined voltage level. At 522, the battery management module configures the switches of the power source for charging at or within a predetermined range of a fourth predetermined voltage level (e.g., 1600V).

Although three decision blocks 510, 514, 518 are shown in association with four different maximum voltage levels, a different number of decision blocks may be included for a different number of possible maximum voltage levels.

Subsequent to operations 512, 516, 520, 522, operation 523 may be performed. At 523, the battery management module may initiate charging. This may include, for example, closing input switches (e.g., switches 333, 334 of FIG. 3, switches 440, 442 of FIG. 4, or switches 840, 842 of FIG. 8).

At 524, the battery management module may determine a state of charge of the battery packs of the power source. This may be based on, for example, outputs of sensors 242 of FIG. 2. At 526, the battery management module may determine based on the charging states, whether charging is complete. If yes, the method may end at 528, otherwise operation 523 may be performed as shown or the power source may be reconfigured for charging one or more other battery packs.

Figure 6:
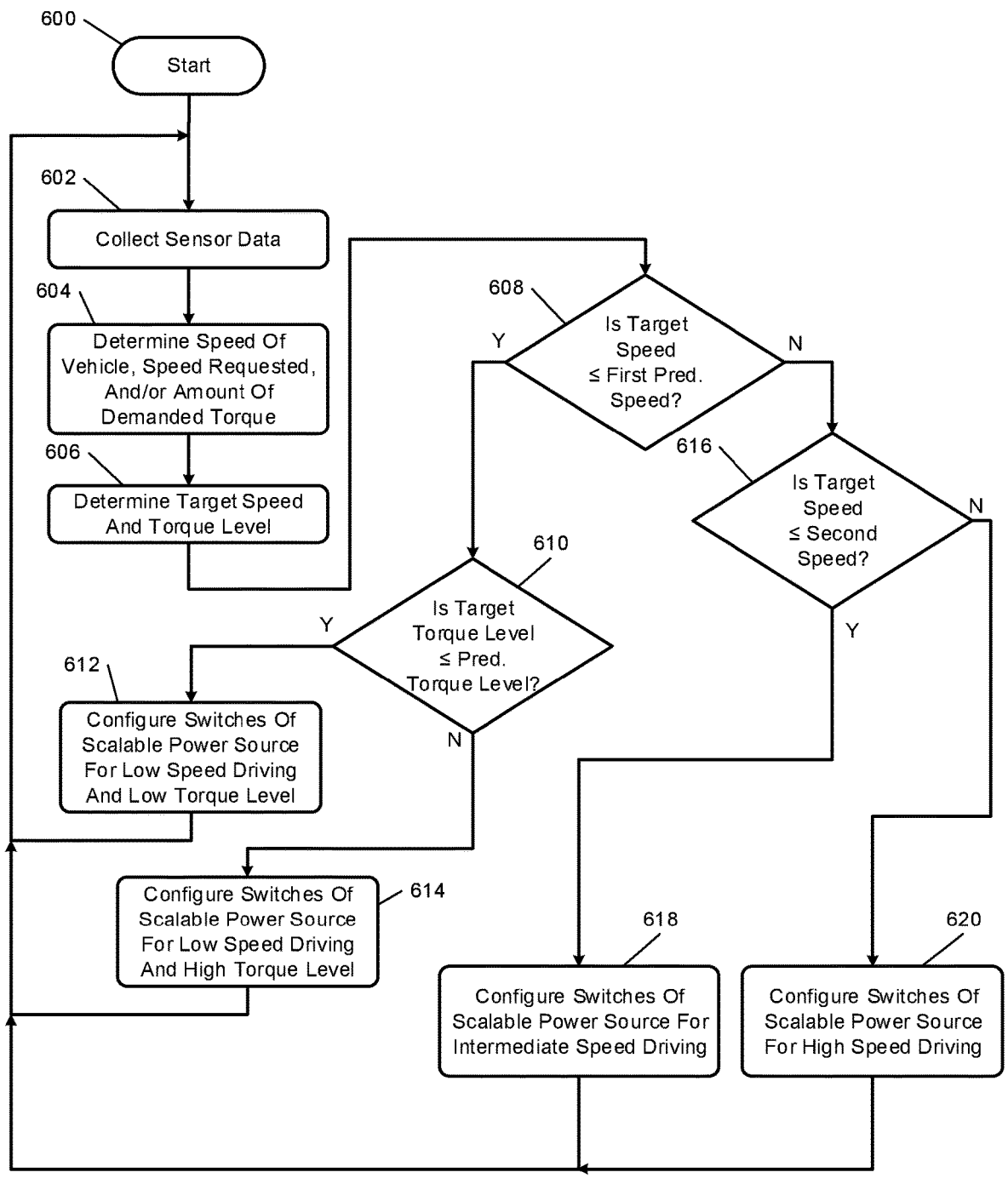
FIG. 6 illustrates an example method of dynamically changing parameters of a power source of a propulsion system in accordance with the present disclosure.

FIG. 6 shows a method of dynamically changing parameters of a power source of a propulsion system. Although the following operations are primarily described with respect to the implementations of FIGS. 1-4 and 8, the operations may be easily modified to apply to other implementations of the present disclosure. The operations may be iteratively performed by the propulsion control module 222 and/or a battery management module, such as one of the above disclosed battery management modules. Each of the following operations are described as being performed by one of these modules, but may be performed by a different one of these modules. During the following operations DC bus voltages are changes for different operating modes. The selection to switch into a parallel mode (fixed propulsion voltage) or high performance mode using adjustable voltage levels, for propulsion, may be user selectable via an input device (e.g., input device 350 of FIG. 3) that is in communication with the vehicle control module and/or the battery management module. Before driving, the user may manually choose to operate in normal parallel mode of battery packs or choose a DC bus adjustable mode for high performance. The user may also specifically choose a parallel mode of operation (fixed voltage) for economical driving or a series mode of operation (fixed voltage) for high performance driving.

The method may begin at 600. At 602, the propulsion control module 222 collects sensor data, which may include data from the power source sensors 242. At 604, the propulsion control module 222 determines speed of the vehicle, a requested speed of the vehicle, an amount of torque requested (or demanded torque), and/or other parameters. One or more of these parameters may be determined based on outputs and/or states of the sensors. At 606, the propulsion control module 222 determines a target speed of the vehicle and a target output torque level for each propulsion motor based on the determined parameters.

At 608, the propulsion control module 222 may determine whether the target speed is less than or equal to a first predetermined speed (e.g., 20 miles-per-hour (mph)). If yes, operation 610 may be performed, otherwise operation 616 may be performed. At 610, the propulsion control module 222 may determine whether the target torque level is less than or equal to a predetermined torque level. If yes, operation 612 may be performed, otherwise operation 614 may be performed. The parameters monitored and determined may be shared with the battery management module.

At 612, the battery management module configures the switches of the scalable power source for low speed driving and a low torque level. For low speed low output torque, a small number of battery packs may be connected in parallel and to the supply and return lines of the power source. At 614, the battery management module configures the switches of the scalable power source for low speed driving and a high torque level. For low speed high output torque (high current level), all or a large number of the battery packs of the power source may be connected in parallel and to the supply and return lines of the power source.

At 616, the propulsion control module 222 determines whether the target speed is less than or equal to a second predetermined speed (e.g., 40 mph). if yes, operation 618 may be performed, otherwise operation 620 may be performed. At 618, the battery management module configures the switches of the scalable power source for intermediate speed driving. As an example, for intermediate speed driving, two or more sets of battery packs may be connected in parallel and to the supply and return lines and battery packs of each of the sets may be connected in series, but not in series with the battery packs of the other set(s). At 620, the battery management module configures the switches of the scalable power source for high speed driving. For high speed driving, all or a large number of the battery packs of the power source may be connected in series and to the supply and return lines of the power source. Subsequent to operations 612, 614, 618, 620, operation 602 may be performed.

Although two decision blocks are shown for three different vehicle speed ranges, any number of decision blocks may be included for any number of vehicle speed ranges.

The above-described operations of FIGS. 5-6 are meant to be illustrative examples. The operations may be performed sequentially, synchronously, simultaneously, continuously, during overlapping time periods or in a different order depending upon the application. Also, any of the operations may not be performed or may be skipped depending on the implementation and/or sequence of events.

FIG. 7 shows a portion 700 of a scalable power source, which may be implemented as part of one or more of the above-described power sources and is provided as an example to illustrate parallel connection of solid-state switches and electromechanical relays. The example of FIG. 7 is shown as an embodiment of the example of FIG. 3, but may be modified to apply to other embodiments disclosed herein including the embodiment of FIG. 4.

In the example shown, electromechanical relays 701, 702, 704 are connected in parallel with switches 320, 321, 330, which may be solid-state switches. Although electromechanical relays 701, 702, 704 are shown connected in parallel with switches 320, 321, 330 other electromechanical relays may be connected in parallel with, for example, switches 322-327 and 331-336 of FIG. 3. Each of the electromechanical relays 701, 702, 704 may be represented by a relay coil and contacts that open and close acting like a switch, which is closed when the relay coil is energized. The electromechanical relays 701, 702, 704 are connected in parallel with the switches 320, 321, 330. The coils when energized close the corresponding electromechanical relays 701, 702, 704. Switches 710, 712, 714 are connected in series with and used to energize the coils. The states of the switches 710, 712, 714 may be controlled by the battery management module 240 of FIG. 3 as described above. The coils may receive power from another power source 720, which as an example, may be a battery separate from the battery packs 308, 310, 312, 314. In one embodiment, the switches 710, 712, and 714 are not included and power is supplied from the power source 720 to the electromechanical relays 701, 702, 704 via the battery management module 240.

FIG. 8 shows a scalable power source 800 including battery packs 802, 804, 806 and 808 that may be connected in series or in parallel between supply and return lines 810, 812. Although four battery packs are shown, two or more battery packs may be included with respective high-side and low-side switches for connections to the supply and return lines 810, 812. The power source 800 includes two single-pole-single-throw (SPST) switches 820, 821 and N−1 double-pole-double-throw (DPDT) switches 830-835, where N is an integer greater than or equal to 2. In one embodiment, N is greater than or equal to 3. In another embodiment, N is greater than or equal to 4. Input switches 840, 842 may be included. The states of the switches 820-821, 830, 832, 834, 840, 842 may be set by the battery management module 850, which may operate similarly as and/or replace one of the above-disclosed battery management modules.

The power source 800 is similar to the power source 400 of FIG. 4 in that it includes multiple similarly configured strings and battery packs. However, the SPDT switches have been replaces with fewer DPDT switches. Any two sets of SPDT switches may be replaced with a DPDT switch and hence it is not necessary to have 2N−2 SPDT switches, but instead include N−1 DPDT switches. This arrangement includes fewer switches than the arrangement of the power source 302 of FIG. 3 and the power source 400 of FIG. 4. There is a total of N+1 switches instead of 3N−1 switches or 2N switches. The battery packs 802, 804, 806, 808 may be connected in series and/or parallel.

When OFF, the DPDT switch poles of the DPDT switches 830, 832, 834 are configured to connect the battery packs 802, 804, 806, 808 in parallel. When ON, the DPDT switch poles of the DPDT switches 830, 832, 834 are configured to connect the battery packs 802, 804, 806, 808 in series.

When two adjacent battery packs (e.g., battery packs 802, 804) are to be connected in series, the battery packs may be turned ON by turning ON the DPDT switch 830 to connect the battery packs in series and to the supply and return lines 810, 812. As a couple other examples, battery packs 804 and 806 or battery packs 806 and 808 may be connected in series instead of battery packs 802 and 804. An even or an odd number of battery packs may be connected in series or in parallel. When all of the DPDT switches are ON, all of the battery packs are connected in series. When all of the DPDT switches are OFF, the battery packs may all be connected in parallel when the SPST switches 820 and 821 are closed.

The power source 800 as shown may include the following connected states when all of the battery packs 802, 804, 806, 808 are available, which are similar to the possible connected states of the power source 302 of FIG. 3 and the power source 400 of FIG. 4. The connected states include: the battery packs 802, 804, 806, 808 being connected in parallel and to the supply and return lines 810, 812; two pairs of the battery packs 802, 804, 806, 808 being connected in parallel and the parallel sets being connected to the supply and return lines 810, 812 and the battery packs in each pair of the battery packs being connected in series; and the battery packs 802, 804, 806, 808 being connected in series and ends of the connected series being connected to the supply and return lines 810, 812. When, for example, one or more of the battery packs are being isolated, then the available connected states are different. For example, if one of the battery packs 802, 804, 806, 808 is isolated, then the remaining battery packs may be (i) connected in series or in parallel and to the supply and return lines 810, 812, or (ii) a subset of the remaining battery packs may be connected in series or in parallel and to the supply and return lines 810, 812. In one embodiment, one or more battery packs are isolated and output voltage is limited while operating in a "limp home" mode. This allows a vehicle to return home and/or drive to a service center.

The above-provided examples provide different battery pack configurations for different vehicle speed and output torque levels to maximize driving efficiency for different driving speeds including, for example, rural, city and highway driving. Low power source output voltages may be provided to minimize losses of an inverter. Switching losses of the inverter depend on the voltage and current levels. For a given number of battery packs of a power source being connected in series and/or parallel, the output power level remains approximately the same, although the output voltage and output current are different for different switch states. High output voltages and low current levels may be provided for high speed driving. The voltage levels are adjusted for different motor speed and thus vehicle speed. In general, the higher the voltage levels, the lower the current levels, except when using only a portion (not all battery packs) of a power source. The more battery packs connected in parallel, the more output current that can be supplied from the power source. The disclosed examples do not include a DC-to-DC converter as do some traditional propulsion systems.

The examples allow for battery pack redundancy. Additional battery packs may be included in a power source and used as backups in case one or more other battery packs are not operating appropriately and are to be isolated. The additional battery packs may be configured the same and connected similar to the other battery packs disclosed herein and have respective switches.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A charging system comprising:
  a scalable power source for powering a motor of a vehicle, the scalable power source comprising
    supply and return lines,
    N battery packs, where N is an integer greater than or equal to 3, and
    a plurality of switches connected to the N battery packs and comprising (i) at least N−1 switches for serially connecting the N battery packs between the supply and return lines, and (ii) a multiple of N switches for parallel connecting the N battery packs to the supply and return lines;
  a telematics module configured to establish a communicate link with a device external to the vehicle, request a capability of a charging station, and receive a response signal from the device indicating the capability of the charging station; and
  a battery management module configured to (i) based on the capability of the charging station, select one of a plurality of available arrangements in which to connect the N battery packs and set states of the plurality of switches to provide the selected one of the plurality of available arrangements, and then (ii) charge the N battery packs based on states of the plurality of switches,
  wherein the plurality of available arrangements include (i) a serial arrangement where the N battery packs are connected serially, (ii) a parallel arrangement where the N battery packs are connected in parallel, and (iii) a hybrid arrangement where sets of the N battery packs are connected in parallel and battery packs in one or more of the sets are connected serially.

2. The charging system of claim 1, further comprising a plurality of electromechanical relays, wherein each of the plurality of electromechanical relays is connected in parallel with a respective one of the plurality of switches.

3. The charging system of claim 2, wherein the plurality of switches are solid-state switches.

4. The charging system of claim 1, wherein:
  the at least N−1 switches are bidirectional; and the multiple of N switches are bidirectional or unidirectional.

5. The charging system of claim 1, wherein:
the battery management module is configured to isolate one or more of the N battery packs and charge a selected set of a remainder of the N battery packs; and
the selected set includes one or more of the remainder of the N battery packs.

6. The charging system of claim 1, wherein the multiple of N switches includes only N switches.

7. A propulsion system comprising:
the charging system of claim 1;
an inverter connected to the scalable power source; and
the motor connected to the inverter,
wherein the battery management module is configured to (i) determine a speed of the vehicle, (ii) select the one of the plurality of available arrangements or another one of the plurality of available arrangements, and (iii) power the motor while the scalable power source is in the one of the plurality of available arrangements or the another one of the plurality of available arrangements.

8. A propulsion system comprising:
a scalable power source for powering a motor of a vehicle, the scalable power source comprising
supply and return lines,
N battery packs, where N is an integer greater than or equal to 3, and
a plurality of switches connected to the N battery packs and comprising (i) at least N−1 switches for serially connecting the N battery packs between the supply and return lines, and (ii) a multiple of N switches for parallel connecting the N battery packs to the supply and return lines; and
a propulsion control module configured to
determine a speed of the vehicle, and
based on the speed of the vehicle, select one of a plurality of available arrangements in which to connect the N battery packs and set states of the plurality of switches to provide the selected one of the plurality of available arrangements, wherein the plurality of available arrangements include (i) a serial arrangement where the N battery packs are connected serially, (ii) a parallel arrangement where the N battery packs are connected in parallel, and (iii) a hybrid arrangement where sets of the N battery packs are connected in parallel and battery packs in one or more of the sets are connected serially,
wherein the scalable power source is configured to power the motor of the vehicle while in the selected one of the plurality of available arrangements.

9. The propulsion system of claim 8, further comprising:
a plurality of electromechanical relays connected in parallel with the plurality of switches; and
the plurality of switches are solid-state switches.

10. The propulsion system of claim 8, wherein the multiple of N switches include only N switches.

11. The propulsion system of claim 8, wherein the propulsion control module is configured to:
determine an output torque of a motor of the vehicle; and
based on the output torque, select the one of the plurality of available arrangements or another one of the plurality of available arrangements.

12. The propulsion system of claim 8, wherein:
the propulsion control module is configured to isolate one or more of the N battery packs and power the motor via a selected set of a remainder of the N battery packs; and
the selected set includes one or more of the remainder of the N battery packs.

13. A propulsion system comprising:
a scalable power source for powering a motor of a vehicle, the scalable power source comprising
supply and return lines,
N battery packs, where N is an integer greater than or equal to 3, and
a plurality of switches connecting the N battery packs to supply and return lines and comprising two single-pole-single-throw switches and 2N−2 single-pole-double-throw switches or N−1 double-pole-double-throw switches, and
a battery management module configured to
determine a capability of a charging station or a parameter of the vehicle,
based on the capability of the charging station or the parameter of the vehicle, select one of a plurality of available arrangements in which to connect the N battery packs, wherein the plurality of available arrangements include (i) a serial arrangement where the N battery packs are connected serially, (ii) a parallel arrangement where the N battery packs are connected in parallel, and (iii) a hybrid arrangement where sets of the N battery packs are connected in parallel and battery packs in one or more of the sets are connected serially, and
set states of the plurality of switches to provide the selected one of the plurality of available arrangements.

14. The propulsion system of claim 13, further comprising a telematics module configured to establish a communicate link with a device external to the vehicle, request the capability of the charging station, and receive a response signal from the device indicating the capability of the charging station,
wherein the battery management module is configured to (i) based on the capability of the charging station, select the one of the plurality of available arrangements and set states of the plurality of switches to provide the selected one of the plurality of available arrangements, and then (ii) charge the N battery packs based on states of the plurality of switches.

15. The propulsion system of claim 13, wherein:
the battery management module is configured to, based on the parameter of the vehicle, select the one of the plurality of available arrangements in which to connect the N battery packs; and
the parameter is a speed of the vehicle.

16. The propulsion system of claim 13, further comprising a plurality of electromechanical relays connected in parallel with the plurality of switches.

17. The propulsion system of claim 13, wherein the plurality of switches are solid-state switches.

18. The propulsion system of claim 13, wherein the plurality of switches include a total of N+1 switches including the two single-pole-single-throw switches and the N−1 double-pole-double-throw switches.

19. The propulsion system of claim 13, wherein:
the battery management module is configured to isolate one or more of the N battery packs and charge a selected set of a remainder of the N battery packs, and
the selected set includes one or more of the remainder of the N battery packs.

20. The propulsion system of claim 13, wherein:
the battery management module is configured to isolate one or more of the N battery packs and power the motor via the scalable power source with a selected set of a remainder of the N battery packs; and the selected set includes one or more of the remainder of the N battery packs.

\* \* \* \* \*